March 12, 1963  P. E. RENOUX ET AL  3,081,103
CHUCK ESPECIALLY FOR LATHES
Filed July 10, 1961  3 Sheets-Sheet 3
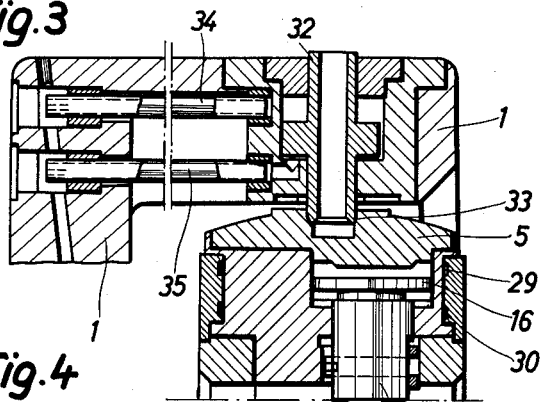
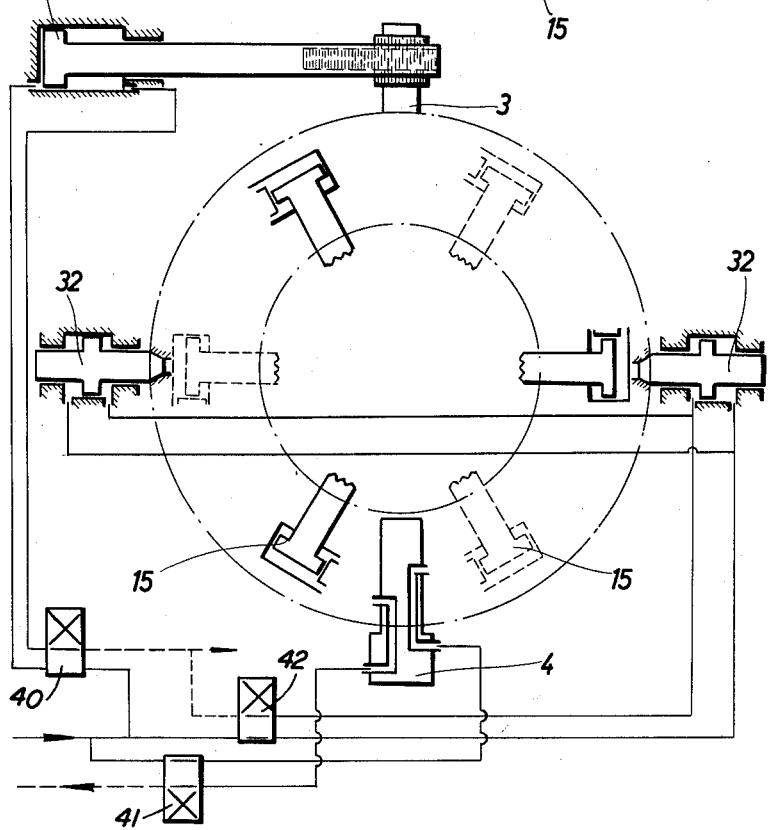

United States Patent Office 3,081,103
Patented Mar. 12, 1963

3,081,103
CHUCK ESPECIALLY FOR LATHES
Pierre Edouard Renoux, Colombes, Seine, France, and Hans Hanrath, Monchen-Gladbach, and Hans Blättry, Dusseldorf, Germany, assignors to Paul Forkardt KG, Dusseldorf, Germany, and Cri-Dan, Paris, France
Filed July 10, 1961, Ser. No. 123,031
Claims priority, application Germany July 12, 1960
5 Claims. (Cl. 279—5)

The present invention relates to two-jaw or more-jaw chucks, especially for lathes.

On turning machines, frequently work pieces have to be machined on both sides as for instance connecting sleeves or the like. Such machining on both sides will be effected by chucking the work pieces twice, offset by 180°. In an effort to avoid this twofold chucking operation and the twofold stopping of the machine spindle and thereby to reduce the main machining time, chucks have been suggested which during the operation of the spindle may be turned by 180°.

It is an object of the present invention further to simplify the chucks of the above mentioned type.

It is another object of this invention to provide a chuck which will make it possible to machine a work piece in the chuck from opposite sides while simultaneously permitting a concentric adjustment of all jaws in said chuck.

These and other objects and advantages of the invention will appear more clearly from the following specification in connection with the accompanying drawings, in which:

FIG. 3 is a section through a locking device for use in connection with the chuck according to the invention.

Figure 1:
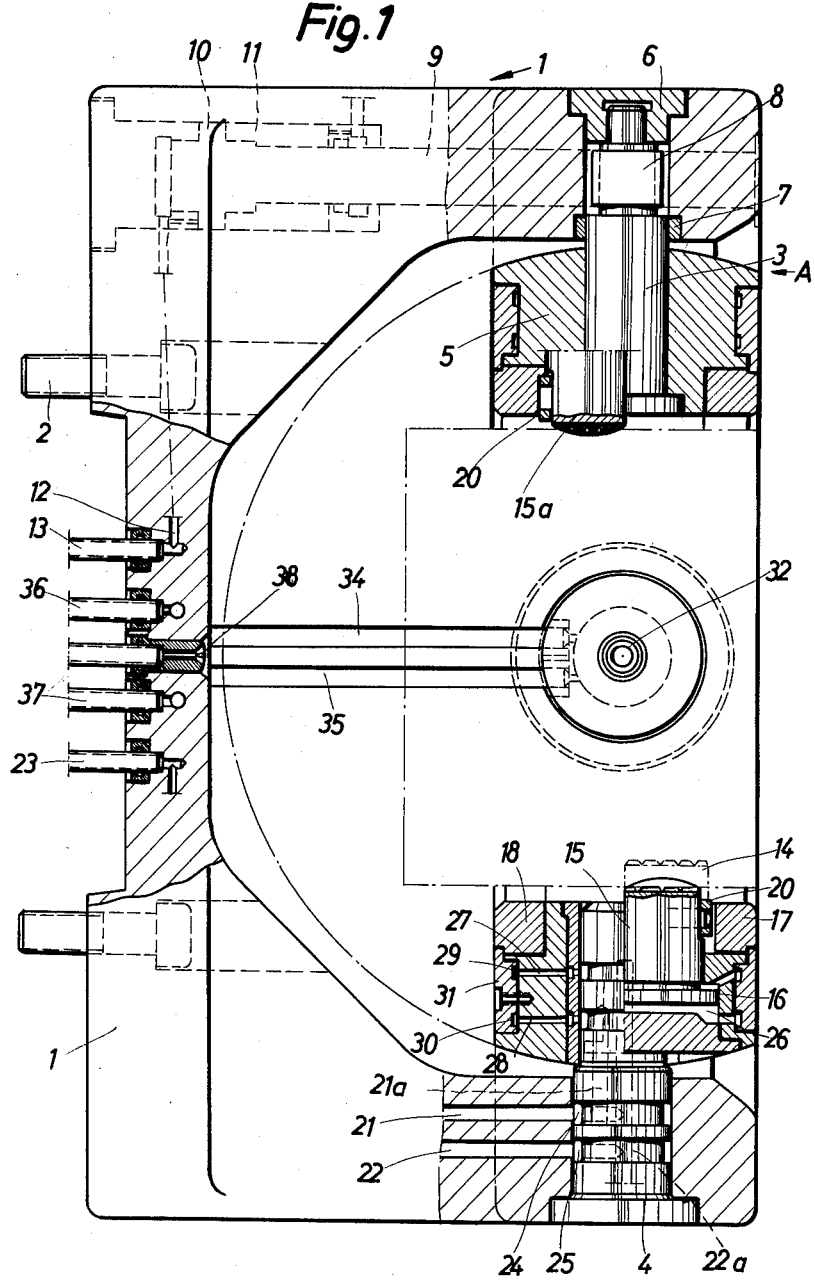
FIG. 1 is a longitudinal section through a chuck according to the present invention.

FIG. 4 diagrammatically illustrates the hydraulic circuit for a chuck according to the present invention.

The chuck according to the present invention, in which a chuck ring is rotatably journalled in a supporting body on two pivots, is characterized primarily in that the chuck ring has actuating pistons reciprocably mounted therein which for purposes of a concentric movement of the chuck jaws are connected to a synchronizing ring through the intervention of rollers, sliding members slidable in grooves, or the like. In this way, a concentric and simultaneous movement of all chuck jaws in the chuck will be effected.

According to one practical embodiment of the present invention, one of the two pivots for the chuck ring may be provided with a pinion meshing with a gear rack operable by a piston for effecting a turning operation about the axis of said pivot. One of the two pivots of the chuck ring may be designed as rotatable control member for supplying oil or another pressure fluid to the pistons controlling the movement of the chuck jaws.

In order to obtain a precise position of the chuck ring after a turning operation of the chuck about the axis of its pivots, one or more pistons may be arranged in the nonturnable supporting body. These pistons have that end thereof which is adjacent to the center of the chuck provided with a suitable surface, for instance a conical surface, for use in connection with a locking operation.

Referring now to the drawings in detail, the chuck comprises a pot-shaped supporting body 1 which is connected by screws 2 or the like to the spindle head of the machine not illustrated. The annular front portion of said supporting body has rotatably mounted therein a supporting pivot 3 which is fixedly connected to a chuck ring 5 in any convenient manner, for instance by a press fit or by brazing. The outer peripheral surface of said chuck ring is spherical. That end of pivot 3 which protrudes from the chuck ring 5 is journalled in bearing bushings 6 and 7 mounted in the supporting body 1. Mounted between said two bearing bushings and fixedly connected to pivot 3 is a pinion 8 which meshes with a gear rack 9. The left-hand end (with regard to FIG. 1) of said gear rack 9 has connected thereto a fluid operable piston 10 for reciprocating said gear rack. By means of this reciprocating movement it is possible to turn the entire chuck ring journalled by means of the two pivots 3 and 4 by an angle of 180°. The cylinder 11 in which piston 10 is reciprocably mounted receives the necessary pressure fluid through two adjacent conduits 12. These conduits are supplied with pressure fluid through conduits 13 extending through the hollow machine tool spindle, not shown.

Pivot 4, which is located opposite pivot 3, is designed for conveying the pressure fluid and, more specifically, for conveying the pressure fluid to the chuck jaws 14 which are exchangeably mounted on the piston rods 15 of the pressure piston 16.

The particular embodiment shown in the drawing comprises six jaw actuating pistons 16 of which three each are located in one and the same plane offset with regard to each other by 180°. The plane of the three piston rods 15 is located adjacent to the plane of the other three piston rods 15a.

According to the present invention the two sets of three pistons each are respectively interconnected by two turnable synchronizing rings 17 and 18 respectively in such a way that a uniform radial movement of the pistons of each set will be assured. The synchronizing rings 17 and 18 are provided with inclined grooves 19 (FIG. 2) engaged by rollers 20 (FIG. 1) or corresponding studs or sliding members, which in their turn are supported by the piston rods 15 and 15a. Each three or more chucking jaws located in one and the same plane will thus carry out a concentric chucking movement. The two sets of chucks illustrated in the drawing will effect a concentric chucking operation but independently of each other so that raw or slightly conically shaped work pieces may be safely chucked in two planes.

The supply of oil or other pressure fluid to the chucking cylinders for chucking or disengaging is effected through two conduit systems 21 and 22. The pressure fluid is supplied through two supply conduits 23 arranged one behind the other. The pivot 4 is provided with annular passages 24 and 25 which in their turn communicate through bores 21a, 22a with the pressure sides of piston 16 in cylinder 26. From this cylinder 26 conduits 27 and 28 lead to additional annular passages 29 and 30 in a lid ring 31. Through the intervention of these annular passages 29 and 30, the remaining pistons in the same plane will be supplied with pressure fluid.

By actuating piston 10 (FIG. 1) by means of gear rack 9 and pinion 8, the chuck ring 5 is turned by an angle of slightly more than 180°. After this end position has been reached, two locking pistons 32 are actuated by the pressure fluid. These locking pistons are located in the supporting body 1, for instance between two pistons 16. The chuck ring 5 is furthermore provided with a bore 33 in conformity with the end of the locking piston 32. This end of the locking piston 32 may for instance be provided with a conical surface so that when the locking piston is displaced in the direction of the chuck ring 5, the said conical surface will enter the bore 30 and thereby will precisely locate the chuck ring 5. In this way, the turning position of the chuck ring is arrested and locked in its precise working position. For instance two locking pistons 32 offset with regard to each other by 180° may be employed. These locking pistons receive their actuating fluid through conduits 34 and 35 which conduits lead to the conduits 36 and 37 likewise extending through the hollow spindle of the machine.

For controlling each movement—chucking, turning and locking—there will in each instance be required a four-way valve 40, 41, 42 which may be of any standard design.

Figure 2:
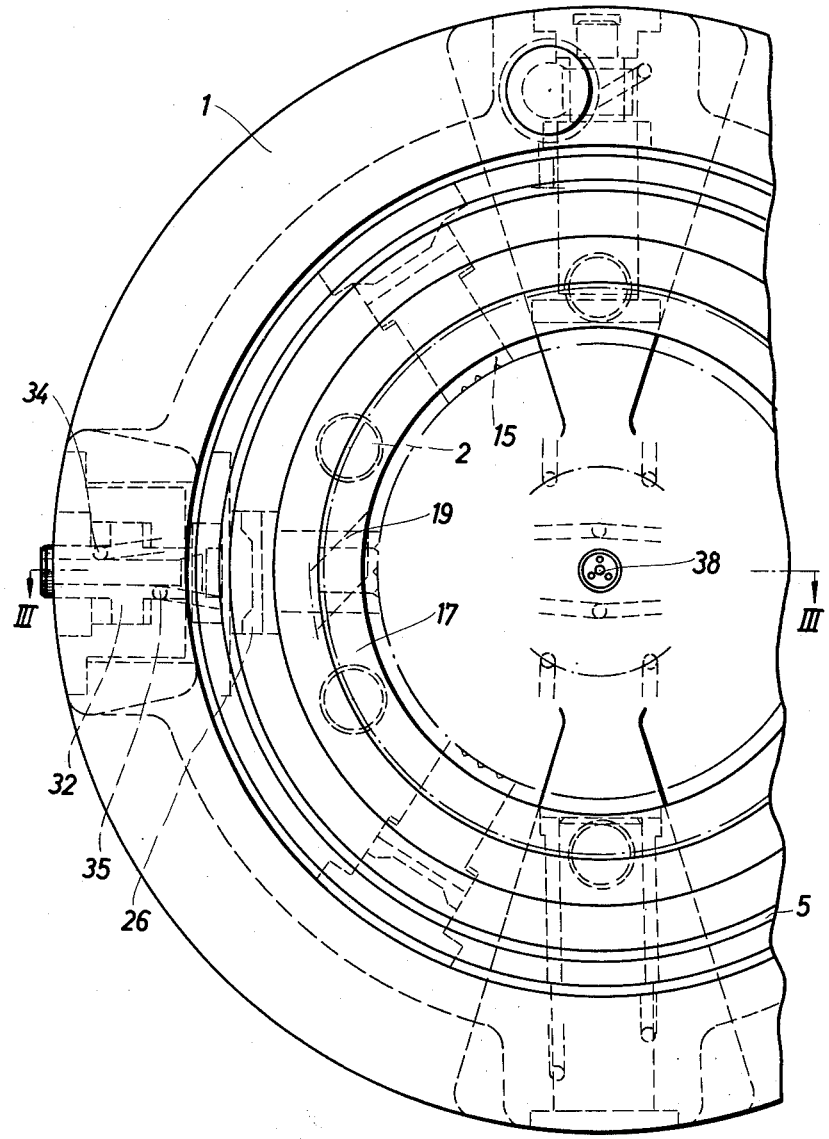
FIG. 2 is a front view of the chuck of FIG. 1 seen in the direction of the arrow A.

FIG. 1 furthermore indicates that a nozzle 38 for a cooling medium may be arranged in the center of the supporting body 1.

It is, of course, to be understood that the present invention is, by no means, limited to the particular construction shown in the drawings but also comprises any modifications within the scope of the appended claims.

What we claim is:

1. A chuck, especially for lathes, which comprises: a supporting body, a chuck ring arranged within said supporting body, axially aligned pivot means pivotally interconnecting said supporting body and said chuck ring for selective turning movement of said chuck ring relative to said supporting body about the axes of said pivot means, a plurality of chuck jaws radially displaceably mounted in said chuck ring, a plurality of radially movable and fluid operable piston means operatively connected to said chuck jaws for actuating the same, synchronizing ring means rotatably mounted in said chuck ring, means operatively connected to said chuck jaws and guided by said synchronizing ring means for concentrically moving said chuck jaws, and means for conveying fluid to and withdrawing fluid from said piston means.

2. A chuck, especially for lathes, which comprises: a supporting body, a chuck ring arranged within said supporting body, two axially aligned pivots pivotally interconnecting said supporting body and said chuck ring for selective turning movement of said chuck ring relative to said supporting body about the axes of said pivots, a plurality of chuck jaws radially displaceably mounted in said chuck ring, a plurality of radially movable and fluid operable piston means operatively connected to said chuck jaws for actuating the same, one of said pivots being provided with passage means communicating with said piston means for conveying actuating fluid to and from the latter during a relative movement between said chuck ring and said supporting body, synchronizing ring means rotatably mounted in said chuck ring, means operatively connected to said chuck jaws and guided by said synchronizing ring means for concentrically moving said chuck jaws, and means for conveying fluid to and withdrawing fluid from said piston means.

3. A chuck, especially for lathes, which comprises: a supporting body, a chuck ring arranged within said supporting body, two axially aligned pivots pivotally interconnecting said supporting body and said chuck ring for selective turning movement of said chuck ring relative to said supporting body about the axes of said pivots, a plurality of chuck jaws radially displaceably mounted in said chuck ring, a plurality of radially movable and fluid operable piston means operatively connected to said chuck jaws for actuating the same, pinion means fixedly connected to one of said pivots, gear rack means meshing with said pinion means and operable to rotate the latter, said last mentioned pivot being rotatably connected to said chuck ring for rotating the latter in response to a rotation of said pinion means, synchronizing ring means rotatably mounted in said chuck ring, means operatively connected to said chuck jaws and guided by said synchronizing ring means for concentrically moving said chuck jaws, and means for conveying fluid to and withdrawing fluid from said piston means.

4. A chuck, especially for lathes, which comprises: a supporting body, a chuck ring arranged within said supporting body, axially aligned pivot means pivotally interconnecting said supporting body and said chuck ring for selective turning movement of said chuck ring relative to said supporting body about the axes of said pivot means, a plurality of chuck jaws radially displaceably mounted in said chuck ring, a plurality of radially movable and fluid operable piston means operatively connected to said chuck jaws for actuating the same, synchronizing ring means rotatably mounted in said chuck ring, means operatively connected to said chuck jaws and guided by said synchronizing ring means for concentrically moving said chuck jaws, and locking means supported by said supporting body and operable to engage said chuck ring for locking the same in a predetermined position.

5. An arrangement according to claim 4, in which a peripheral portion of said chuck ring is provided with conically shaped recess means, and in which said locking means includes fluid operable means having one end thereof shaped in conformity with said conically shaped recess means for engaging the same in predetermined positions of said chuck ring.

References Cited in the file of this patent
UNITED STATES PATENTS

| | | |
|---|---|---|
| 1,783,989 | Wetmore | Dec. 9, 1930 |
| 2,643,132 | Hunziker | June 23, 1953 |
| 2,930,626 | Sharp | Mar. 29, 1960 |